United States Patent
Osugi (10) Patent No.: US 8,724,993 B2
(45) Date of Patent: May 13, 2014

(54) STATION SIDE DEVICE AND OPTICAL COMMUNICATION SYSTEM

(75) Inventor: Moritomo Osugi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 339 days.

(21) Appl. No.: 13/125,874

(22) PCT Filed: Mar. 27, 2009

(86) PCT No.: PCT/JP2009/001410
§ 371 (c)(1),
(2), (4) Date: Apr. 25, 2011

(87) PCT Pub. No.: WO2010/109542
PCT Pub. Date: Sep. 30, 2010

(65) Prior Publication Data
US 2011/0206373 A1    Aug. 25, 2011

(51) Int. Cl.
*H04J 14/00* (2006.01)

(52) U.S. Cl.
USPC .............. 398/70; 398/58; 398/72

(58) Field of Classification Search
USPC ............... 398/58–72
See application file for complete search history.

(56) References Cited

U.S. PATENT DOCUMENTS

| | | | |
|---|---|---|---|
| 2002/0120769 A1* | 8/2002 | Ammitzboell | 709/238 |
| 2004/0213177 A1 | 10/2004 | Moritani et al. | |
| 2005/0281265 A1* | 12/2005 | Sakamoto et al. | 370/390 |
| 2008/0062408 A1 | 3/2008 | Lai et al. | |
| 2008/0095093 A1* | 4/2008 | Oogushi et al. | 370/312 |
| 2008/0304828 A1* | 12/2008 | Mizutani et al. | 398/78 |
| 2009/0201819 A1* | 8/2009 | Mizutani et al. | 370/241.1 |

FOREIGN PATENT DOCUMENTS

| | | |
|---|---|---|
| JP | 2004 320725 | 11/2004 |
| JP | 2004 343243 | 12/2004 |
| JP | 2009 21940 | 1/2009 |
| TW | 200814567 | 3/2008 |

OTHER PUBLICATIONS

Office Action issued Nov. 30, 2012, in Taiwanese Patent Application No. 098120041 with English translation.
International Search Report issued May 26, 2009 in PCT/JP09/01410 filed Mar. 27, 2009.
Deering, Steve: "Host Extensions for IP Multicasting", RFC1112, pp. 1-18, (Aug. 1989).

(Continued)

*Primary Examiner* — Dzung Tran
(74) *Attorney, Agent, or Firm* — Oblon, Spivak, McClelland, Maier & Neustadt, L.L.P.

(57) ABSTRACT

In multicast transfer in a passive optical network (PON) system, an optical line terminal (OLT) is provided, which dynamically changes the longest response time included in a General Query message or a Specific Query message to control the timing at which a given terminal device transmits a report message. This reduces the possibility that the OLT has failed in getting some report messages from terminal devices due to lack of processing capability, and reduces the waste of the band due to useless transmission of multicast packets, which is caused by a delay in reporting that the given terminal device has left a multicast group, by taking into consideration both the message processing capability of the OLT and the number of optical network units (ONUs) each of which has terminal devices being subordinate thereto and belonging to the same multicast group.

7 Claims, 5 Drawing Sheets

(56) References Cited

OTHER PUBLICATIONS

Fenner, W.: "Internet Group Management Protocol, Version 2", RFC2236, The Internet Society, pp. 1-24, (Nov. 1997).
Cain, et al., "Internet Group Management Protocool, Version 3", RFC3376, The Internet Society, pp. 1-53, (Oct. 2002).
Deering, et al., "Multicast Listener Discovery (MLD) for IPv6", RFC2710 The Internet Society, pp. 1-22, (Oct. 1999).
Vida & Costa: "Multicast Listener Discovery Version 2 (MLDv2) for IPv6", RFC3810, The Internet Society, pp. 1-62, (Jun. 2004).
Ikeda H et al: "Architecture and Design of IP Broadcasting System Using Passive Optical Network,", IEICE Transactions On Communications, Communications Society, Tokyo, JP, vol. E91 B, No. 8, Aug. 1, 2008, pp. 2477-2484, XP001515900, ISSN: 0916-8516, DOI: 10.1093/IRTCOM/E91-B.8.2477.

* cited by examiner

Multicast Group Management Table

| Multicast Group Address | Last Listener | Number of ONUs |
|---|---|---|
| 224. X. X. X | #2 Terminal Device | x |
| 224. Y. Y. Y | #4 Terminal Device | y |
| 224. Z. Z. Z | #n Terminal Device | z |

FIG. 3

ONU Filter Management Table

| ONU Number | Filtering Information (Multicast Group Address Allowed to Pass Through) |
|---|---|
| #1 | 224. X. X. X |
| | 224. Y. Y. Y |
| | 224. Z. Z. Z |
| #2 | 224. X. X. X |
| | 224. Y. Y. Y |
| ⋮ | ⋮ |
| #n | 224. Z. Z. Z |

STATION SIDE DEVICE AND OPTICAL COMMUNICATION SYSTEM

FIELD OF THE INVENTION

The present invention relates to a station side device and an optical communication system which are applied to a PON (Passive Optical Network) system, and which control the timing when transmitting a report message which is a control signal at a time of performing a multicast transfer of Ethernet (Ethernet: registered trademark) frames to a plurality of terminal devices.

BACKGROUND OF THE INVENTION

An Ethernet PON system connects an OLT (Optical Line Terminal) with a plurality of ONUs (Optical Network Units) by way of optical transmission media, and performs transmission and reception of data by using MAC (Media Access Control) frames to transparently accommodate an Ethernet transfer service therein. The OLT is installed in a communication network carrier station, and each ONU is installed inside or outside of a subscriber's house. Each ONU accommodates one or more terminal devices.

On the other hand, as a method of implementing a multicast transfer via IP communications which have become widely available, there is a method of implementing a multicast transfer by using IGMP (Internet Group Management Protocol) or MLD (Multicast Listener Discovery). IGMP and MLD are protocols used for management of an IP multicast group, and are used by a multicast router that supports a multicast transfer and a terminal device that receives multicast packets. Their operations will be briefly shown below.

The multicast router carries out a multicast transfer of a Query message at regular intervals, and grasps its members by judging whether the multicast router has received a report message from each terminal device. Each terminal device sends a Join message when joining a group, and sends a report message when answering a Query message. Each terminal device notifies a Leave message or a Done message, or stops sending a report message when leaving a group to which the terminal device belongs.

As such a multicast transfer using IGMP or MLD, there are a configuration via a LAN (Local Area Network) including layer 2 switches and a configuration via a PON system.
[Nonpatent reference 1] RFC1112 (Host Extensions for IP Multicasting)
[Nonpatent reference 2] RFC2236 (Internet Group Management Protocol, Version 2)
[Nonpatent reference 3] RFC3376 (Internet Group Management Protocol, Version 3)
[Nonpatent reference 4] RFC2710 (Multicast Listener Discovery (MLD) for IPv6)
[Nonpatent reference 5] RFC3810 (Multicast Listener Discovery Version 2 (MLDv2) for IPv6)

However, in a multicast transfer in a general IP network like a multicast transfer in a configuration via a LAN, as an example of background of the present invention, because transmission of a report message by another terminal device can be detected, only one terminal device is allowed to transmit a report message in response to a Query message.

In contrast, in a configuration via a PON system, as an example of background of the present invention, because a report message transmitted from a terminal device connected to an ONU cannot be detected by any other terminal device connected to another ONU different from the ONU in view of the characteristics of the PON system, in a multicast transfer via the PON system, in response to a Query message report messages are transmitted from all ONUs to which all terminal devices belonging to the corresponding multicast group are connected. As a result, the larger number of ONUs to which all terminal devices belonging to the same multicast group are connected, the larger number of report messages are transmitted to the OLT. Therefore, the possibility that the OLT has failed in getting some report messages because of lack of its processing capability increases.

As a measure of preventing a failure in reception of some report messages from occurring, there is a technique of increasing a robustness variable value to increase the number of times that report messages are retransmitted. However, because this technique further increases the number of report messages which the OLT has to receive, it is adversely effective on a failure in reception of some report messages which results from lack of the processing capability of the OLT.

In order to reduce the possibility that the OLT has failed in getting some report messages because of lack of its processing capability, it is effective to lessen the number of report messages which the OLT has to receive per unit time and it is therefore possible to increase the longest response time included in a Query message. Because the timer included in each terminal device which receives a Query message has an initial value which is a random value equal to or smaller than the longest response time, an increase in the longest response time relatively lengthens the time interval during which report messages are transmitted from terminal devices connected to different ONUs and belonging to the same multicast group, the terminal devices being respectively subordinate to the different ONUs, to the OLT.

A problem is however that because an increase in the longest response time which can be set, but has an arbitrary fixed value causes a delay to occur when a terminal device leaves a multicast group, and this results in a waste of the band due to useless transmission of multicast packets.

It is an object of the present invention to provide a station side device and an optical communication system which prevent a failure in reception of some report messages from occurring resulting from lack of the processing capability thereof, and which reduce the waste of the band due to useless transmission of multicast packets, which is caused by a delay in reporting that a terminal device has left a multicast group, as much as possible.

DISCLOSURE OF THE INVENTION

A station side device and an optical communication system in accordance with the present invention are characterized in that the station side device dynamically sets up a longest response time which is included in a query message according to the message processing capability thereof so as to dynamically change the transmission timing at which a terminal device transmits a report message.

According to the present invention, because the station side device dynamically sets up the longest response time which is included in a query message according to the message processing capability thereof, there is provided an advantage of being able to reduce the possibility that the station side device has failed in getting some report messages from terminal devices because of lack of its processing capability, and also reduce the waste of the band due to useless transmission of multicast packets, which is caused by a delay in reporting that a terminal device has left a multicast group.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
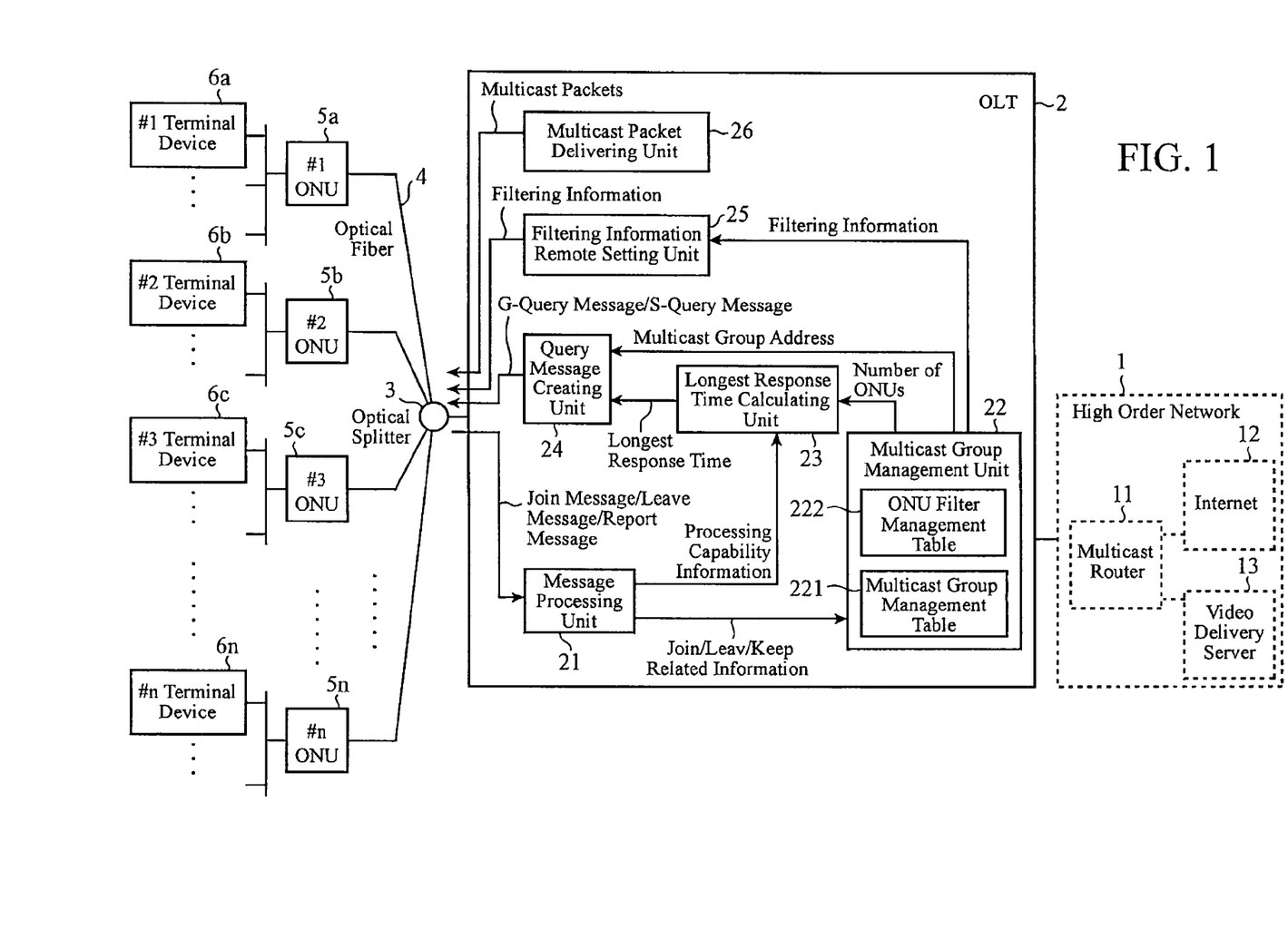
FIG. 1 is a functional block diagram showing the structure of a PON system in accordance with Embodiment 1 of the present invention.

FIG. 1 is a functional block diagram showing the structure of a PON system (an optical communication system) in accordance with Embodiment 1 of the present invention. In the figure, an OLT (a station side device) 2 is connected to a high order network 1, an optical splitter (a splitting device) 3 for splitting an optical fiber into optical fibers 4 is connected to the OLT 2, a #1 ONU (an optical network unit) to a #n ONU 5a to 5n are respectively connected to the split optical fibers 4, and a #1 terminal device (a host) to a #n terminal device 6a to 6n are respectively connected to the #1 ONU to the #n ONU 5a to 5n, each of the terminal devices being subordinate to the corresponding ONU.

In the figure, only one terminal device is shown to be connected to each of the #1 ONU to the #n ONU 5a to 5n, each of the terminal devices being subordinate to the corresponding ONU. Actually, at least one terminal device is connected to each of the #1 ONU to the #n ONU 5a to 5n.

The high order network 1 is comprised of a multicast router 11, the Internet 12, and a video delivery server 13.

The OLT 2 is comprised of a message processing unit 21, a multicast group management unit 22, a longest response time calculating unit 23, a Query message creating unit 24, a filtering information remote setting unit 25, a multicast packet delivering unit 26, and the multicast group management unit 22 is comprised of a multicast group management table 221 and an ONU filter management table 222.

Each of the #1 ONU to #n ONU 5a to 5n includes a filter which can transfer or discard multicast packets for each multicast group address, and the OLT 2 makes a remote setting of filtering information to only an ONU which has terminal devices belonging to a certain multicast group and being subordinate thereto in such a way that the ONU allows multicast packets to pass therethrough, and also implements a multicast transfer by distributing multicast packets transferred from the high order network 1 to all the ONUs.

The message processing unit 21 has a function of processing a Join message, a Leave message, or a report message which is received from each ONU to provide information about joining, leaving, or keeping for each multicast group to both the multicast group management table 221 and the ONU filter management table 222, and a function of providing processing capability information showing the number of messages which the message processing unit can process per unit time to the longest response time calculating unit 23.

The multicast group management unit 22 has a function of dynamically updating the contents of the multicast group management table 221 and those of the ONU filter management table 222 by using the information about joining, leaving, or keeping for each multicast group from the message processing unit 21.

Figure 2:
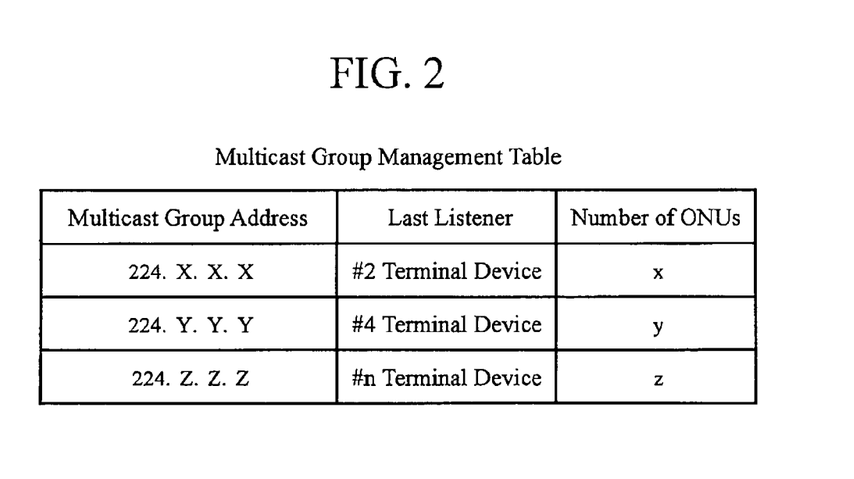
FIG. 2 is an explanatory drawing showing an example of a multicast group management table.

FIG. 2 is an explanatory drawing showing an example of the multicast group management table. The multicast group management table 221 manages the last listener (Last Listener: the last receiving terminal device) and the number of ONUs each of which has one or more terminal devices belonging to the same multicast group and being subordinate thereto for each multicasting group address.

By using the functions of the multicast group management unit 22, when determining that there is a multicast group in which a terminal device has newly joined from related information about joining, leaving, or keeping for each multicast group from the message processing unit 21, the OLT adds the address of the multicasting group to the multicast group management table 221, or when determining that there is a multicast group to which no terminal device has belonged, the OLT deletes the address of the multicasting group from the multicast group management table 221.

The multicast group management table also manages the number of ONUs each of which has one or more terminal devices belonging to a certain multicast group and being subordinate thereto for each multicasting group address. This number of ONUs is determined from the contents of the ONU filter management table 222 which will be explained below.

Figure 3:
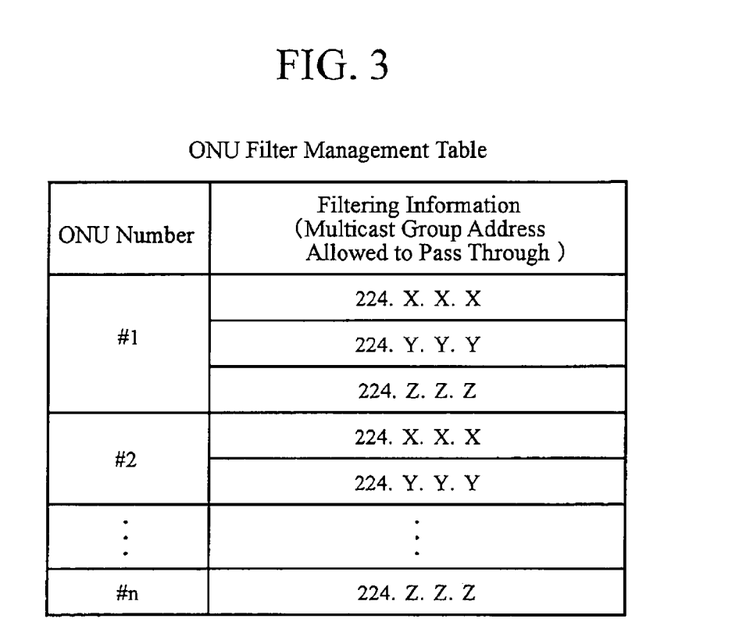
FIG. 3 is an explanatory drawing showing an example of an ONU filter management table.

FIG. 3 is an explanatory drawing showing an example of the ONU filter management table, and this ONU filter management table 222 manages filtering information for each ONU. Multicasting group addresses which can be made to pass through each ONU by the filter included in each ONU are managed as filtering information. When a terminal device being subordinate to an ONU joins a new multicast group, the address of the new multicasting group is added to the filtering information of the corresponding ONU number, whereas when a terminal device being subordinate to an ONU leaves a multicast group, the corresponding address of the multicasting group is deleted from the corresponding filtering information.

In the filtering information of an ONU which has one or more terminal devices belonging to a certain multicast group and being subordinate thereto, the corresponding multicasting group address is included. Therefore, the number of ONUs each of which has one or more terminal devices belonging to the same multicast group and being subordinate thereto can be calculated for each multicasting group address in the multicast group management table 221 from the information included in the ONU filter management table 222.

The longest response time calculating unit 23 has a function of dynamically determining the longest response time according to both the processing capability information informed thereto from the message processing unit 21, and the number of ONUs each of which has one or more terminal devices belonging to the same multicast group and being subordinate thereto, the number of ONUs being calculated for each multicasting group address and informed thereto from the multicast group management table 221, and informing the longest response time to the Query message creating unit 24.

When the number of messages which the message processing unit 21 can process per unit time is expressed as M and the number of ONUs each of which has one or more terminal devices belonging to a certain multicast group and being subordinate thereto is expressed as x, the longest response time t which is included in a G-Query message (a General query message) or an S-Query message (a Specific query message) about the multicast group is determined from the following equation (1).

$$t=\{\alpha*(x+\beta)/(M+\gamma)\}+\delta \quad (1)$$

where α, β, γ, and δ are arbitrary constants.

The Query message creating unit 24 has a function of, in response to a multicasting group address informed thereto from the multicast group management unit 22, generating a G-Query message or an S-Query message used for querying whether a terminal device continues to belong to the corresponding multicast group, and including the longest response time informed thereto from the longest response time calculating unit 23 in the G-Query message or the S-Query message to transmit this message to the ONUs.

According to the filtering information of the ONU filter management table 222, in order to cause only an ONU which has one or more terminal devices belonging to a certain multicast group and being subordinate thereto to allow multicast packets to pass therethrough, the filtering information remote setting unit 25 makes a remote setting of the filtering information to only the ONU having the corresponding ONU number.

The multicast packet delivering unit 26 delivers multicast packets transferred thereto from the high order network 1 to all the ONUs.

Each of the #1 terminal device to the #n terminal device 6*a* to 6*n* has a function of receiving a G-Query message or an S-Query message, and, when belonging to the multicast group included in the message, starting its timer having an initial value which is a random value equal to or smaller than the longest response time included in the message and transmitting a report message to the corresponding ONU in turn when the timer reaches zero.

Next, the operation of the PON system will be explained.

Figure 4:
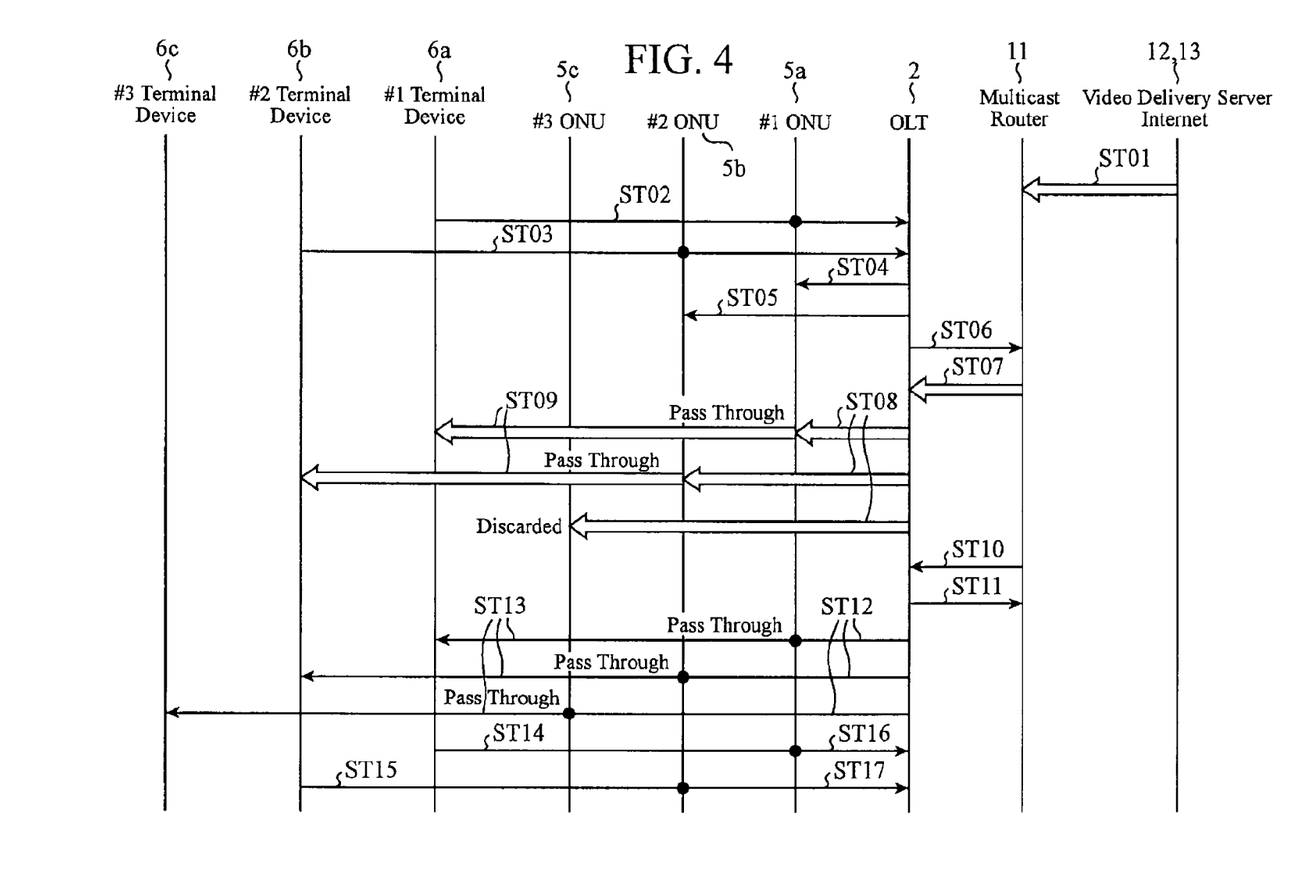
FIG. 4 is a sequence diagram showing an operation of performing a multicast transfer of the PON system in accordance with Embodiment 1 of the present invention.
Figure 5:
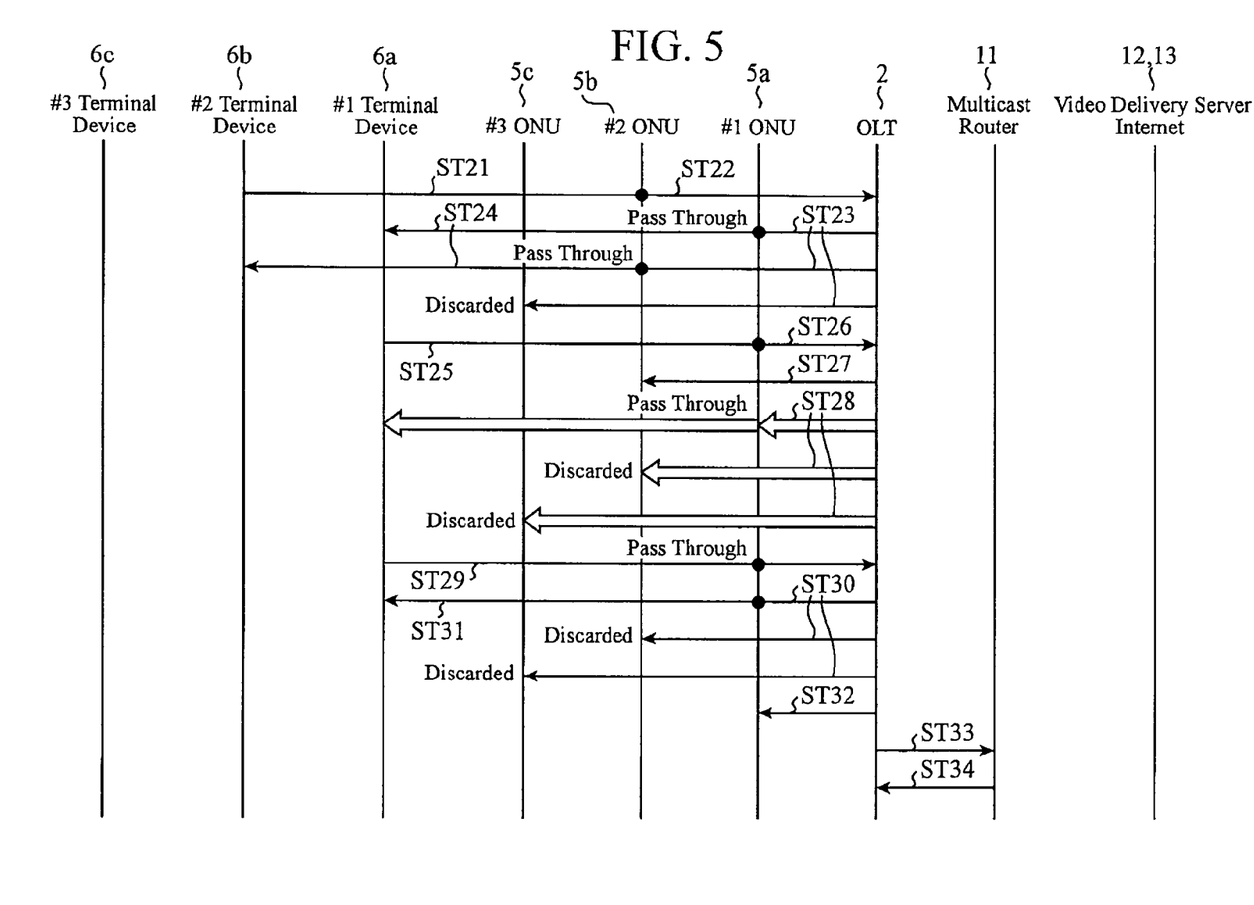
FIG. 5 is a sequence diagram showing the operation of performing a multicast transfer of the PON system in accordance with Embodiment 1 of the present invention.

FIGS. 4 and 5 are sequence diagrams showing an operation of performing a multicast transfer of the PON system in accordance with Embodiment 1 of the present invention.

As a method of implementing a multicast transfer by way of the PON system, there are an MCB (Multiple Copy Broadcast) method of copying downlink multicast packets as needed and then transferring them by using a multicast router, and an SCB (Single Copy Broadcast) method of transferring downlink multicast packets by using a multicast router without copying them. Hereafter, the SCB method will be shown.

First, a terminal device's joining a multicast group will be explained.

In FIGS. 1 and 4, multicast packets are transferred from the Internet 12 or the video delivery server 13 in the high order network 1 to the multicast router 11 (ST01). However, because any terminal device does not provide a multicasting viewing and listening request, any useless multicast packets are not transferred to the OLT 2 by the multicast router 11.

Next, each of the #1 terminal device 6*a* and the #2 terminal device 6*b* transfers a Join message to the OLT 2 to issue a multicasting viewing and listening request to the OLT (ST02 and ST03). In this case, the #1 ONU 5*a* and the #2 ONU 5*b* do not process the Join messages from the #1 terminal device 6*a* and the #2 terminal device 6*b*, respectively, but transfer them to the OLT 2 just as they are. Hereafter, it is assumed that the #1 terminal device 6*a* and the #2 terminal device 6*b* join an identical multicast group.

It is assumed that the OLT 2 is provided with a proxy function. The message processing unit 21 of the OLT 2 processes the Join messages received thereby, and delivers them to the multicast group management unit 22, and the multicast group management unit 22 generates a management table required for multicast transfer.

The multicast group management unit 22 adds the address of the multicasting group (e.g., 224.x.x.x) to the multicast group management table 221 in response to the Join messages delivered thereto, and also adds the ONU numbers and filtering information (e.g., #1 and #2 as the ONU numbers, and 224.x.x.x as the filtering information) to the ONU filter management table 222.

Furthermore, from the addition of the ONU numbers and filtering information to the ONU filter management table 222, the multicast group management unit 22 determines the number of ONUs (e.g., x=2) having terminal devices being subordinate thereto and joining the same multicast group specified by the multicasting group address (e.g., 224.x.x.x) in the multicast group management table 221. The multicast group management unit 22 then adds the number of ONUs to the multicast group management table 221.

From the addition of the ONU numbers and filtering information to the ONU filter management table 222, the filtering information remote setting unit 25 carries out a remote setting of the filtering information to only the ONUs respectively having the corresponding ONU numbers according to the filtering information of the ONU filter management table 222 in such a way that only the #1 ONU 5*a* and the #2 ONU 5*b* respectively having the #1 terminal device 6*a* and the #2 terminal device 6*b* belonging to the same multicast group (e.g., 224.x.x.x) and being subordinate thereto allow information to pass therethrough (ST04 and ST05).

Furthermore, the OLT 2 transfers only one of the Join messages indicating that they join the multicast group to the multicast router in order to detect that the two received Join messages indicate that they join the same multicast group (ST06).

The multicast router 11 which has received the Join message transfers the multicast packets transferred in ST01 to the OLT 2 (ST07). The multicast packet delivering unit 26 of the OLT 2 delivers the received multicast packets to all the ONUs (ST08).

The #1 ONU 5*a* and the #2 ONU 5*b* allow the multicast packets to pass therethrough according to the filtering information which has been remotely set thereto, so that the #1 terminal device 6*a* and the #2 terminal device 6*b* can receive the multicast packets (ST09). In contrast, because the #3 ONU 5*c* discards the multicast packets with filtering, the #3 terminal device 6*c* cannot receive the multicast packets.

The above-mentioned operation is the one of joining a multicast group.

Next, a keeping operation which the OLT performs after a terminal device has joined a multicast group will be explained.

The multicast router 11 transmits a G-Query message to the OLT 2 at regular intervals in order to query about a state of whether a terminal device belongs to a multicast group (ST10). The OLT 2 which has received the G-Query message refers to the multicast group management table 221, and transmits a report message to the multicast router 11 according to whether or not there exists a terminal device belonging to the multicasting group specified by the address included in the G-Query message (ST11). Because the multicast router 11 which has received the report message can determine that a terminal device belongs to the corresponding multicast group, the multicast router 11 keeps the multicast group.

In order to check the information of the multicast group management table 221 and that of the ONU filter management table 222, the Query message creating unit 24 of the OLT 2 transmits a G-Query message to all the ONUs at regular intervals independently from the G-Query message received from the multicast router 11 (ST12).

At that time, the message processing unit 21 delivers the processing capability information indicating the number of messages which the message processing unit can process per unit time to the longest response time calculating unit 23, and the multicast group management unit 22 reads information indicating the corresponding number of ONUs included in the multicast group management table 221 and then delivers the information to the longest response time calculating unit 23. For example, when the Query message creating unit 24 transmits a G-Query message for the multicasting group address (224.x.x.x), the multicast group management unit reads the number (x) of ONUs corresponding to the multicasting group address (224.x.x.x) included in the multicast group management table 221.

The longest response time calculating unit 23 dynamically determines the longest response time on the basis of the above-mentioned equation (1) and according to both the processing capability information informed thereto from the message processing unit 21, and the number of ONUs each of which has one or more terminal devices belonging to the same multicast group and being subordinate thereto, the number of ONUs being calculated for each multicasting group address and informed thereto from the multicast group management unit 22.

The Query message creating unit 24 transmits to the generated G-Query message to all the ONUs by including the longest response time informed thereto from the longest response time calculating unit 23 in the G-Query message. Because the destination address of the G-Query message is a Well-known multicasting grouped address, all the ONUs which have received the G-Query message allow this G-Query message to pass therethrough, so that all the terminal devices receive the G-Query message (ST13).

Each of the #1 terminal device 6a and the #2 terminal device 6b which belong to the multicast group (224.x.x.x) among the terminal devices which have received the G-Query message starts its timer having an initial value which is a random value equal to or smaller than the longest response time included in the G-Query message. These terminal devices transmit report messages in order that their timers reach zero to the corresponding ONUs, respectively (ST14 and ST15).

The #1 ONU 5a and the #2 ONU 5b which have received the report messages transfer them to the OLT 2 without processing them, respectively (ST16 and ST17). The message processing unit 21 of the OLT 2 processes the report messages received thereby, and delivers them to the multicast group management unit 22. The multicast group management unit 22 can check the information of the multicast group management table 221 and that of the ONU filter management table 222 from the report messages delivered thereto, and, when a change occurs in the information due to addition, leaving, or the like of a new terminal device, changes the information of the management tables and also changes the filtering information and carries out a remote setting of the filtering information to each ONU.

Because of the characteristics of the PON system, such as attainment of security among ONUs and effective use of the downlink band, the OLT does not return any report message transmitted from a certain terminal device back to another terminal device.

The above-mentioned operation is the one of keeping a multicast group.

Next, an operation of the optical communication system when a terminal device belonging to a multicast group leaves the multicast group will be explained.

Hereafter, a case in which a terminal device transmits a Leave message will be explained.

In FIGS. 1 and 5, in a state in which the #1 terminal device 6a and the #2 terminal device 6b are receiving multicast packets, only the #2 terminal device 6b transmits a Leave message to the #2 ONU 5b in order to leave the multicast group (ST21). In this case, it is assumed that the #2 terminal device 6b is the last listener in the multicast group. The #2 ONU 5b transfers the Leave message received from the #2 terminal device 6b to the OLT 2 without processing the Leave message (ST22).

The message processing unit 21 of the OLT 2 processes the Leave message received thereby and delivers the processed Leave message to the multicast group management unit 22, and the multicast group management unit 22 verifies the corresponding multicast group included in the management table.

Because the last listener at the multicasting group address (224.x.x.x) in the multicast group management table 221 is the #2 terminal device and the OLT has received the Leave message from this #2 terminal device 6b, the OLT makes a request of the Query message creating unit 24 to transmit an S-Query message for querying whether there exists another terminal device belonging to the same multicast group as that specified by the multicasting group address (224.x.x.x). The Query message creating unit 24 then transmits the S-Query message to all the ONUs according to the transmission request (ST23).

At that time, the message processing unit 21 delivers the processing capability information indicating the number of messages which the message processing unit can process per unit time to the longest response time calculating unit 23, and the multicast group management unit 22 reads information indicating the corresponding number of ONUs (x) included in the multicast group management table 221 and then delivers the information to the longest response time calculating unit 23.

The longest response time calculating unit 23 dynamically determines the longest response time on the basis of above-mentioned equation ((1) in paragraph 0028) and according to both the processing capability information delivered thereto from the message processing unit 21, and the number of ONUs each of which has one or more terminal devices belonging to the same multicast group and being subordinate thereto, the number of ONUs being calculated for each multicasting group address and informed thereto from the multicast group management unit 22.

The Query message creating unit 24 transmits the S-Query message generated thereby to all the ONUs by including the longest response time informed thereto from the longest response time calculating unit 23 in the S-Query message. Because the destination address of the S-Query message is the address of the corresponding multicasting group, the #1 ONU 5a and the #2 ONU 5b transfer the S-Query messages received thereby to the #1 terminal device 6a and the #2 terminal device 6b, respectively (ST24) while the #3 ONU 5c discards the S-Query message received thereby with filtering.

The #1 terminal device 6a which has received the S-Query message starts its timer having an initial value which is a random value equal to or smaller than the longest response time included in the received S-Query message in order to continue to belong to the multicast group. When the timer reaches zero, the #1 terminal device transmits a report message to the #1 ONU 5a (ST25). In contrast, because the #2 terminal device 6b desires to leave the multicast group, the #2 terminal device does not transmit any report message. The #1 ONU 5a transfers the received report message to the OLT 2 without processing the report message (ST26).

The message processing unit 21 of the OLT 2 which has received the report message from the #1 ONU 5a processes the received report message, and transmits this processed report message to the multicast group management unit 22. Because the multicast group management unit 22 can determine that the terminal device has continued to belong to the corresponding multicast group, the multicast group management unit keeps the corresponding multicast group included in the multicast group management table 221, updates the last listener to the #1 terminal device and deletes the filtering information (224.x.x.x) of the #2 ONU from the ONU filter management table 222, and also updates the number of ONUs of the multicasting group address (224.x.x.x) in the multicast group management table 221 to (x−1). The multicast group management unit further carries out a remote setting of the changed filtering information to the #2 ONU 5b by way of the filtering information remote setting unit 25 (ST27).

Hereafter, because the corresponding multicast group included in the multicast group management table 221 is maintained, the OLT 2 does not transmit any Leave message to the multicast router 11 by using the proxy function. Because the multicast router 11 does not receive any Leave message from the OLT 2, the multicast router maintains the multicast group and continues to transmit multicast packets to the OLT 2. Although the multicast packet delivering unit 26 of the OLT 2 transfers multicast packets received thereby to all the ONUs, only the #1 terminal device 6a receives the multicast packets because the #2 ONU 5b and the #3 ONU 5c discard the multicast packets with filtering (ST28).

After the #1 terminal device 6a then transmits a Leave message to the #1 ONU 5a in order to leave from the multicast group, too (ST29), the message processing unit 21 of the OLT 2 which has received the Leave message from the #1 ONU 5a processes the Leave message received thereby, and delivers the processed Leave message to the multicast group management unit 22, and the multicast group management unit 22 verifies the corresponding multicast group included in the management table.

Because the last listener at the multicasting group address (224.x.x.x) in the multicast group management table 221 is the #1 terminal devices and the OLT has received the Leave message from this #1 terminal device 6a, the OLT makes a request of the Query message creating unit 24 to transmit an S-Query message for querying whether there exists another terminal device belonging to the same multicast group as that specified by the multicasting group address (224.x.x.x). The Query message creating unit 24 then transmits the S-Query message to all the ONUs according to the transmission request (ST30).

At that time, the message processing unit 21 delivers the processing capability information indicating the number of messages which the message processing unit can process per unit time to the longest response time calculating unit 23, and the multicast group management unit 22 reads information indicating the corresponding number of ONUs (x−1) included in the multicast group management table 221 and then delivers the information to the longest response time calculating unit 23.

The longest response time calculating unit 23 dynamically determines the longest response time on the basis of above-mentioned equation (1) and according to both the processing capability information delivered thereto from the message processing unit 21, and the number of ONUs each of which has one or more terminal devices belonging to the same multicast group and being subordinate thereto, the number of ONUs being calculated for each multicasting group address and informed thereto from the multicast group management unit 22.

The Query message creating unit 24 transmits the S-Query message generated thereby to all the ONUs by including the longest response time informed thereto from the longest response time calculating unit 23 in the S-Query message. Because the destination address of the S-Query message is the address of the corresponding multicasting group, the #1 ONU 5a transfers the S-Query message received thereby to the #1 terminal device 6a (ST31) while the #2 ONU 5b and the #3 ONU 5c discard the S-Query messages received thereby with filtering.

Because the #1 terminal device 6a which has received the S-Query message does not continue to belong to the same multicast group, the terminal device does not transmit any report message. Therefore, the OLT 2 does not receive any report message. Unless the OLT 2 does not receive any report message even after a predetermined time preset in consideration of the longest response time determined by the longest response time calculating unit 23 has elapsed, the multicast group management unit 22 of the OLT 2 deletes the corresponding multicast group (224.x.x.x) from the multicast group management table 221 and the ONU filter management table 222, and carries out a remote setting of the changed filtering information to the #1 ONU 5a by way of the filtering information remote setting unit 25 (ST32) and transmits a Leave message to the multicast router 11 (ST33).

The multicast router 11 which has received the Leave message from the OLT 2 transmits an S-Query message (ST34), and the OLT 2 which has received the S-Query message then refers to the multicast group management table 221, but does not transmit any report message to the multicast router 11 because there is no terminal device belonging to the multicasting group specified by the multicasting group address included in the S-Query message. Because the multicast router 11 does not receive any report message from the OLT 2, the multicast router deletes the multicast group and stops the transmission of multicast packets to the OLT 2. The above-mentioned operation is the one which is performed in multicast transfer when a terminal device leaves from a multicast group.

In a case of "joining", the terminal device which is the transmit source of the Join message which the OLT 2 has received finally is the last listener in the multicast group management table 221, whereas in a case of "keeping", the terminal device which is the transmit source of the report message which the OLT 2 has received finally is the last listener in the multicast group management table 221. Therefore, in a case in which the last listener has "left", the terminal device which has transmitted a report message finally in response to an S-Query message transmitted at that time newly becomes the last listener in the multicast group management table 221.

As mentioned above, the OLT in accordance with this Embodiment 1 dynamically sets up the longest response time, which a terminal device can spend until transmitting a report message after the terminal device has received a G-Query message or an S-Query message, according to the message processing capability information outputted from the message processing unit 21. Therefore, the OLT in accordance with this Embodiment 1 can reduce the possibility that the OLT has failed in getting some report messages from terminal devices because of lack of the message processing capability of the message processing unit 21, and can also reduce the waste of the band due to useless transmission of multicast packets, which is caused by a delay in reporting that a terminal device has left a multicast group.

Furthermore, the OLT in accordance with this Embodiment includes the multicast group management unit 22 for dynamically managing the number of ONUs each of which has one or more terminal devices belonging to a multicast group and being subordinate thereto, and the longest response time calculating unit 23 dynamically sets up the longest response time which a terminal device can spend until transmitting a report message after the terminal device has received a Query message according to both the message processing capability information outputted from the message processing unit 21, and the number of ONUs each of which has one or more terminal devices belonging to a multicast group managed by the multicast group management unit 22 and being subordinate thereto. Therefore, in addition to reduction in the possibility that the OLT has failed in getting some report messages and reduction in the waste of the band due to useless transmission of multicast packets, the optical communication system in accordance with this Embodiment 1 can set up the longest response time more precisely.

In addition, on the basis of the filtering information stored in the ONU filter management table 222, the OLT in accordance with this Embodiment 1 determines the number of ONUs each of which has one or more terminal devices belonging to a multicast group and being subordinate thereto. Therefore, the optical communication system does not have to grasp the number of terminal devices by performing a complicated process, such as ECMP, and can easily calculate the number of ONUs required for the setup of the longest response time.

ECMP (Express Count Management Protocol) is a technology of grasping the number of terminal devices belonging to a multicast group, though the explanation of the technology will be omitted because its processing is complicated.

Embodiment 2

Figure 6:
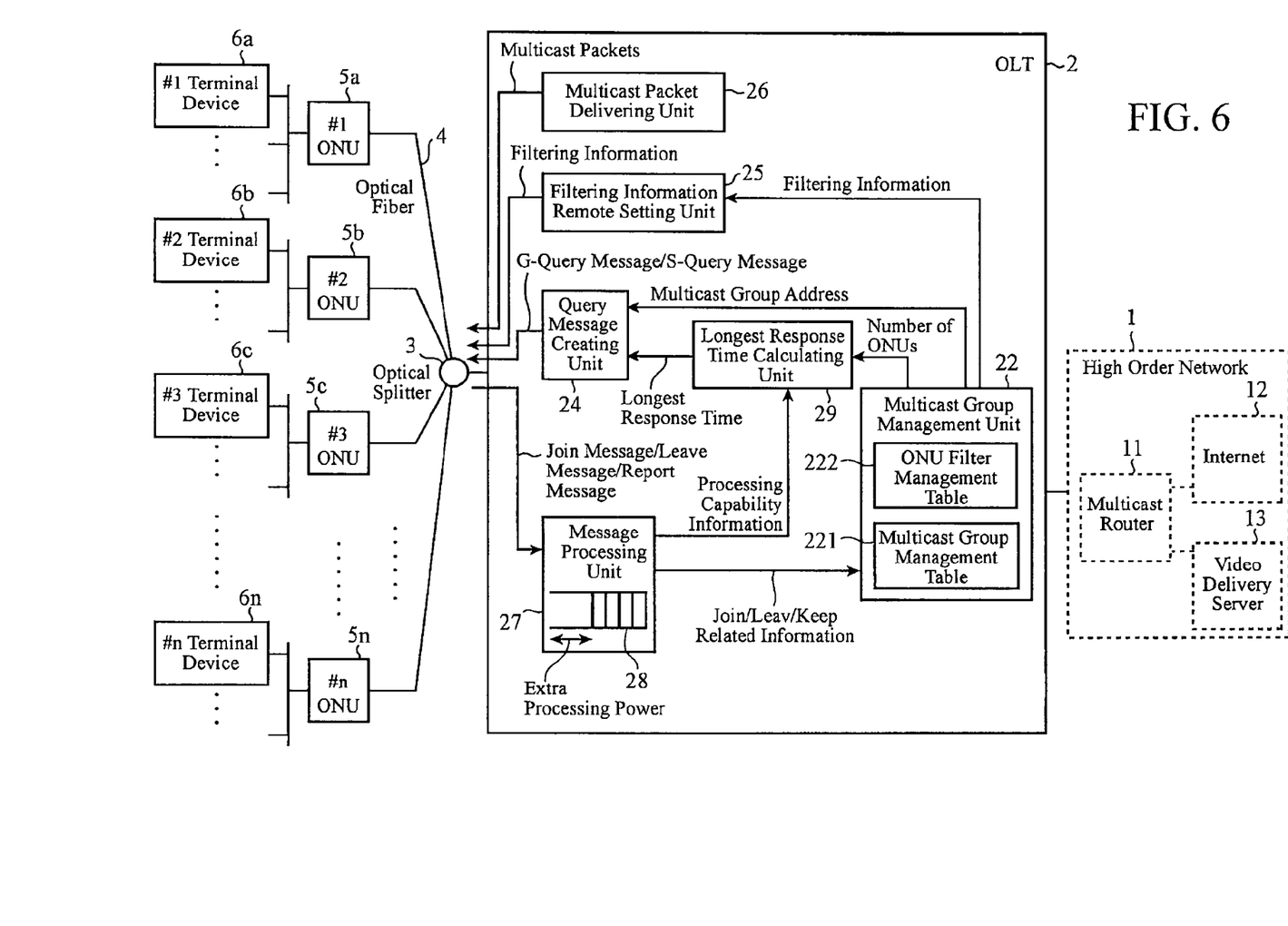
FIG. 6 is a functional block diagram showing the structure of a PON system in accordance with Embodiment 2 of the present invention.

FIG. 6 is a functional block diagram showing the structure of a PON system in accordance with Embodiment 2 of the present invention. In the figure, a message processing unit 27 has a function of informing extra processing power information (message processing capability information) based on the number of messages which the message processing unit can process additionally, the number of messages being assumed to be current extra processing power, to a longest response time calculating unit 29.

More concretely, the message processing unit 27 has an incoming message buffer 28 for storing report messages received thereby in turn, and for outputting a report message which is stored therein so as to be processed later, and defines the current remaining capacity of the incoming message buffer 28 as the current extra processing power.

The longest response time calculating unit 29 has a function of dynamically determining the longest response time according to both the extra processing power information delivered thereto from the message processing unit 21, and the number of ONUs each of which has one or more terminal devices belonging to the same multicast group and being subordinate thereto, the number of ONUs being calculated for each multicasting group address and informed thereto from a multicast group management table 221, and informing the longest response time to a Query message creating unit 24.

When the extra processing power information based on the number of messages which the message processing unit 27 can process additionally, the number of messages being assumed to be the current extra processing power which varies from moment to moment, is expressed as m and the number of ONUs each which has one or more terminal devices belonging to a certain multicast group and being subordinate thereto is expressed as x, the longest response time t which is included in a G-Query message or an S-Query message about the above-mentioned multicast group is determined from the following equation (2).

$$t=\{\alpha^*(x+\beta)/(m+\gamma)\}+\delta \quad (2)$$

where $\alpha$, $\beta$, $\gamma$, and $\delta$ are arbitrary constants.

The other structure of the optical communication system is the same as that of above-mentioned Embodiment 1, the duplicated explanation of the other structure will be omitted hereafter.

Next, the operation of the optical communication system will be explained.

As explained in above-mentioned Embodiment 1, the OLT determines the longest response time simultaneously when the Query message creating unit 24 generates a G-Query message or an S-Query message. In contrast, in a longest response time determining method which the longest response time calculating unit 29 in accordance with this Embodiment 2 uses, the longest response time calculating unit dynamically determines the longest response time according to both the extra processing power information delivered thereto from the message processing unit 27 and based on the current remaining capacity of the incoming message buffer 28, and the number of ONUs each of which has one or more terminal devices belonging to the same multicast group and being subordinate thereto, the number of ONUs being calculated for each multicasting group address and informed thereto from the multicast group management table 221, and informs the longest response time to the Query message creating unit 24. More concretely, the longest response time calculating unit dynamically determines the longest response time according to above-mentioned equation (2).

As mentioned above, the optical communication system in accordance with this Embodiment 2 sets up the longest response time dynamically according to the extra processing power information based on the number of messages which can be processed additionally, the number of messages being assumed to be the current extra processing power. Therefore, as compared with the case of using the processing capability information (a fixed value) indicating the number of messages which can be processed per unit time, the optical communication system in accordance with this Embodiment 2 can set up the longest response time dynamically according to the state of the message processing unit which varies from moment to moment.

INDUSTRIAL APPLICABILITY

As mentioned above, the OLT 2 in accordance with the present invention includes the message processing unit 21 for receiving, by way of an ONU, a report message based on either a terminal device's keeping belonging to a multicast group or a terminal device's leaving a multicast group, the report message being transmitted by the terminal device in response to a Query message, so as to update the management of ONUs each of which has one or more terminal devices belonging to the multicast group and being subordinate thereto according to the report message, and for outputting message processing capability information, the longest response time calculating unit 23 for dynamically setting up the longest response time which a terminal device can spend until transmitting a report message after the terminal device has received a Query message according to the message processing capability information outputted by the above-mentioned message processing unit 21, and the Query message creating unit 24 for transmitting a Query message for querying whether a terminal device belonging to a multicast group continues to belong to the multicast group to the above-mentioned terminal device by way of the above-mentioned ONU by including the longest response time set up by the above-mentioned longest response time calculating unit 23 into the Query message. Therefore, the OLT is suitable for use in a PON system which controls the timing at which a report message which is a control signal at the time of carrying out a multicast transfer of Ethernet frames to a plurality of terminal devices is transmitted.

The invention claimed is:

1. A station side device comprising:
 a message processing unit for receiving, via an optical network unit, a report message from a terminal device which, in response to a query message, has sent out the report message according to whether the terminal device keeps belonging to a multicast group or leaves the multicast group so as to update management of the optical network unit having terminal devices each being subordinate thereto and belonging to a multicast group according to said report message, and for outputting message processing capability information;
 a longest response time calculating unit for dynamically setting up a longest response time which a terminal device can spend until transmitting a report message after receiving a query message according to the message processing capability information outputted from said message processing unit; and
 a message creating unit for transmitting a query message for querying whether a terminal device belonging to a multicast group continues to belong to the multicast group to said terminal device by way of said optical network unit after including the longest response time set up by said longest response time calculating unit in the query message.

2. The station side device according to claim 1, characterized in that said station side device includes a multicast group management unit for dynamically managing a number of optical network units each of which has terminal devices each being subordinate thereto and belonging to a multicast group, and the longest response time calculating unit dynamically sets up the longest response time which a terminal device can spend until transmitting a report message after receiving a query message according to both the message processing capability information outputted from the message processing unit, and the number of optical network units each of which has terminal devices each being subordinate thereto and belonging to a multicast group, the number of optical network units being managed by said multicast group management unit.

3. The station side device according to claim 2, characterized in that the multicast group management unit stores a filter management table in which filtering information including a multicasting group address which is allowed to pass through for each of the optical network units is described, and determines the number of optical network units each of which has terminal devices each being subordinate thereto and belonging to a multicast group on a basis of the filtering information stored in said filter management table.

4. The station side device according to claim 1, characterized in that the message processing unit uses, as the message processing capability information, processing capability information based on a number of messages which can be processed per unit time, and the longest response time calculating unit dynamically sets up the longest response time in such a way that the longest response time decreases as the processing capability becomes higher.

5. The station side device according to claim 1, characterized in that the message processing unit uses, as the message processing capability information, extra processing power information based on a number of messages which can be processed additionally, the number of messages being assumed to be current extra processing power, and the longest response time calculating unit dynamically sets up the longest response time in such a way that the longest response time decreases as the extra processing power becomes higher.

6. The station side device according to claim 5, characterized in that the message processing unit includes an incoming message buffer for storing report messages received by said message processing unit in turn and for outputting a report message stored therein so that the report message is processed, and defines current remaining capacity of said incoming message buffer as the current extra processing power.

7. An optical communication system including a station side device connected to a high order network, a splitting unit connected to said station side device via an optical fiber, optical network units respectively connected to optical fibers into which said optical fiber is split by said splitting unit, and a terminal device connected to one of said optical network units, in which said station side device carries out a remote setting of filtering information to only an optical network unit having a terminal device being subordinate thereto and belonging to a multicast group so that the optical network unit allows multicast packets to pass therethrough, delivers multicast packets transferred from said high order network to all of said optical network units, and transmits a query message for querying whether said terminal device belonging to the multicast group continues to belong to the multicast group to said terminal device by way of said optical network unit after including a longest response time in the query message, and, in response to the query message, said terminal device transmits a report message based on whether said terminal device keeps belonging to the multicast group or leaves the multicast group to said station side device within the longest response time by way of said optical network unit and said station side device updates management of the optical network unit having the terminal device being subordinate thereto and belonging to the multicast group according to the report message received thereby, characterized in that
 said station side device dynamically sets up the longest response time included in the query message according to message processing capability of said station side device so as to dynamically change transmission timing at which said terminal device transmits the report message.

* * * * *